Jan. 28, 1941.                A. HYDE                2,230,185
                           PINHOLE MONOCLE
                         Filed Jan. 5, 1940
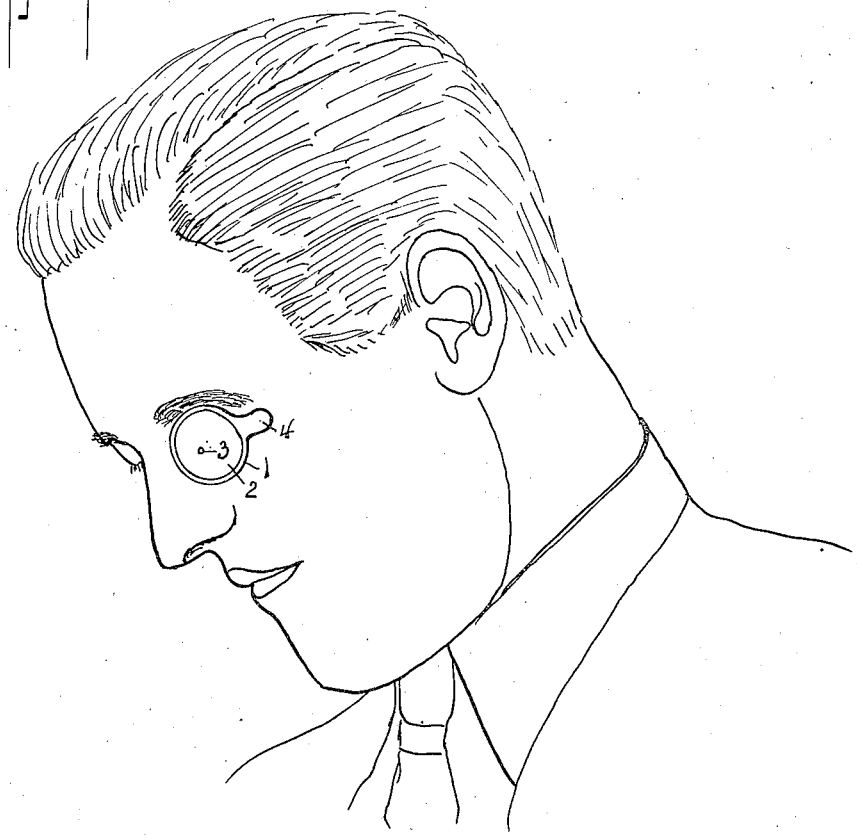
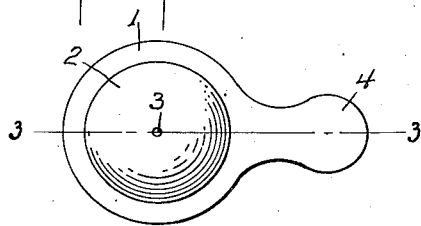
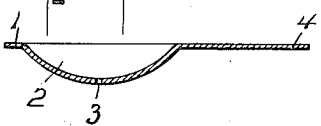
Inventor
Alexander Hyde
By Dieterich & Rutley
                Attorneys.

Patented Jan. 28, 1941

2,230,185

UNITED STATES PATENT OFFICE 2,230,185

PINHOLE MONOCLE

Alexander Hyde, San Francisco, Calif.

Application January 5, 1940, Serial No. 312,604

1 Claim. (Cl. 88—41)

My invention has for its object to provide means whereby, particularly, one having poor vision may read the numbers and names in a telephone directory when at least a sufficient light is present for ordinary reading purposes.

Another object is to provide a simple, inexpensive, article of the character stated which may also be used for advertising purposes.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claim, reference being had to the accompanying drawing, in which:

Fig. 1 is a perspective view illustrating the invention in use.

Fig. 2 is a front elevation of the article.

Fig. 3 is a section on the line 3—3 of Fig. 2.

In the drawing in which like numerals of reference indicate like parts in all the figures, 1 represents the monocle proper which may be stamped from a sheet of suitable material, such as metal, Cellophane, Bakelite, etc. and formed with the concavo-convex or bowl like portion 2 shaped to conform generally to the curvature of one's eyeball. In the center of the concavo-convex portion 2 is a pin-hole 3 through which the user looks.

The portion 1 is of disc-like form while a flat handle 4 extends from the margin thereof. By means of the handle 4 the article can be placed in the eye or otherwise handled.

The outer faces of the bowl 2 and handle 4 serve as convenient surfaces for carrying desired advertising matter applied in any suitable way, as by stamping, for example.

From the foregoing it is thought my invention and its advantages will be clear to those skilled in the art.

What I claim is:

A monocle comprising a body of sheet material having a circular body part and a handle part projecting from the margin of the body part, said body part comprising an annular surface and a concavo-convex central part, the latter having a pinhole at its approximate center.

ALEXANDER HYDE.